Sept. 26, 1939.  W. R. KING  2,174,386

CONTROL SYSTEM

Filed May 20, 1937

Inventor:
William R. King,
by Harry E. Dunham
His Attorney.

Patented Sept. 26, 1939

2,174,386

UNITED STATES PATENT OFFICE 2,174,386

CONTROL SYSTEM

William R. King, Schenectady, N. Y., assignor to General Electric Company, a corporation of New York Application May 20, 1937, Serial No. 143,775

3 Claims. (Cl. 250—27)

This invention relates to control systems, more particularly to systems supplied from a source of periodically varying voltage for controlling the supply to a translating circuit of current impulses of lower frequency than the frequency of the source.

More specifically, the invention relates to control systems in which electric valves are utilized to supply current impulses to a pair of translating circuits, and a further object is the provision of means for controlling the valves to supply current impulses to one of the translating circuits that are out of phase with the current impulses supplied to the other circuit.

In carrying the invention into effect in one form thereof, means are provided for supplying a periodically varying voltage to a translating circuit, and an electric valve having a cathode, anode and control electrode is provided for supplying current impulses to a second translating circuit. The cathode and anode are connected to a source of periodically varying voltage. Means are provided for supplying a negative voltage to the control electrode when the anode voltage is positive thereby to render the valve non-conducting, and means responsive to the current impulses in the first circuit are provided for supplying a positive voltage to the control electrode and controlling this positive voltage so that the valve is conducting when the first circuit is not conducting, so that the current impulses supplied to the two circuits are out of phase.

In illustrating the invention in one form thereof, it is shown as embodied in a system for supplying out-of-phase current impulses to two magnet coils. These coils may be the vibrating magnets of a shaker screen or other similar apparatus in which it is required that two magnet coils deliver out-of-phase vibrations to the apparatus.

Figure 1:
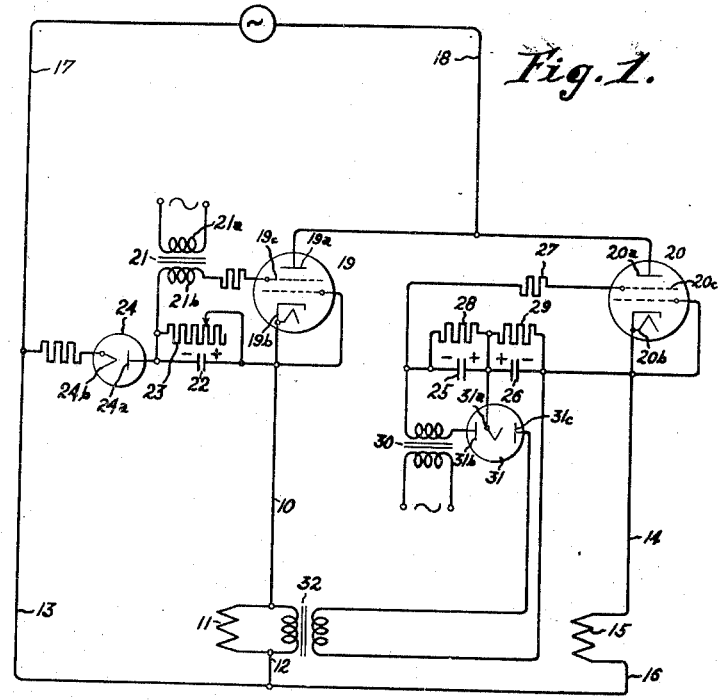
Figure 2:
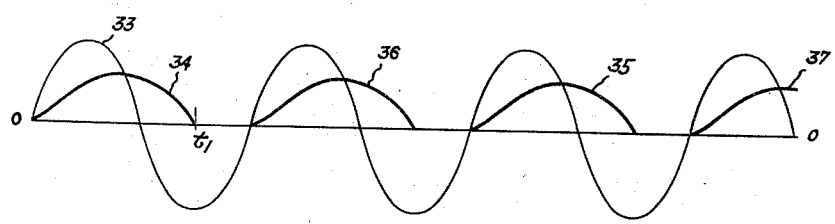

For a better and a more complete understanding of the invention, reference should now be had to the following specification and to the accompanying drawing in which Fig. 1 is a simple, schematic diagram of an embodiment of the invention, and Fig. 2 is a chart of operating characteristics serving to explain the operation of the invention.

Referring now to the drawing, a pair of translating circuits 10, 11, 12 and 13, and 14, 15, 16 are to be supplied with out-of-phase current impulses of a frequency lower than the frequency of the available source of periodically varying voltage, represented by the two supply lines 17, 18. The source 17, 18 may be assumed to be the usual commercial 60-cycle source of alternating voltage available in most industrial areas. Thus, the lower terminals of each of the coils 11 and 15 are connected to the side 17 of the supply source. Electric valves 19 and 20 are interposed in the connections between the opposite terminals of the magnet coils and the side 18 of the supply source. As shown, the anodes 19a and 20a of the valves are connected to the side 18, and the cathodes 19b and 20b are connected to the upper terminals of the coils 11 and 15 respectively. Valves 19 and 20 are also provided with control electrodes or grids 19c and 20c respectively which serve to control the passage of current between the cathodes and anodes of the valves.

Although valves 19 and 20 may be of any suitable type, they are preferably of the three or four electrode type, into the envelope of which a small quantity of a vapor such, for example, as mercury vapor is introduced after exhaust. The presence of this gas within the envelope serves to convert the usual pure electronic discharge of a vacuum tube into an arc stream, thereby constituting the valves electrostatically controlled arc rectifiers. In valves of this type, current will flow between the anode and the cathode during the half-cycle of the applied voltage in which the anode voltage is positive with respect to the cathode voltage, provided the voltage of the grid is more positive than a predetermined critical value necessary to initiate the current flow. Once the current flow has been initiated between the anode and cathode, the grid does not readily control the magnitude of the current flowing in the output circuit. Consequently, the current flow in the output circuit can only be stopped by interrupting the anode circuit or reducing the anode voltage to zero.

For the purpose of supplying a voltage to the grid 19c of valve 19, a transformer 21 is provided, the primary winding 21a of which is connected to a source of alternating voltage which may be and preferably is the same as the source 17, 18. The secondary winding 21b of this transformer is connected in the cathode grid circuit of the valve so that an alternating voltage is introduced into the grid circuit and a positive voltage applied to the grid during each positive half cycle of anode voltage.

As thus far described, electric valve 19 would become conducting once during each cycle of the alternating voltage of the source 17, 18, and would pass an impulse of current to the magnet coil 11 once during each cycle. Since it is desired to pass a lesser number of current impulses to the magnet coil than the number of cycles of the voltage of the source, means are provided for rendering the valve 19 non-conducting during one or more subsequent positive half-cycles of the applied voltage. To this end, an energy storage device, illustrated as a capacitance 22, is connected from the cathode 19b to the side 17 of the supply source and is also connected to the left-hand terminal of the secondary winding 21b of the grid transformer 21. Thus, the capacitance 22 is connected from the cathode 19b to the grid 19c. When the valve 19 is conducting during a positive half-cycle of anode voltage, the capacitance 22 becomes charged and applies a negative voltage to the grid 19c so that during the following positive half-cycle of anode voltage, the voltage of the grid is maintained more negative than the critical grid voltage. As a result, the valve 19 does not conduct current during the following positive half-cycle of anode voltage. In order to render the valve conducting again after one or more positive half-cycles of anode voltage, as desired, means are provided for discharging the capacitance 22 at a predetermined rate. These means are illustrated as variable resistance 23 connected in parallel with the capacitance 22.

In order to prevent the discharge of the capacitance 22 by the reverse voltage across the coil 11, a rectifier 24 is included in the connections between the capacitance 22 and the side 17 of the supply source. Although the rectifier may be of any suitable type, it is preferably a vacuum tube having an anode 24a and a hot cathode 24b which is heated to the required degree of incandescence by means of energy supplied in one of the usual and well understood ways.

A pair of capacitances 25, 26 are connected between the cathode 20b and the grid 20c of valve 20 through a protective resistance 27. Resistances 28 and 29 are connected in parallel with the capacitances 25 and 26 respectively, and the constants of these capacitances and resistances are so chosen that the time constant of the capacitance 26 and its parallel resistor 29 is short in comparison with the time constant of the capacitance 25 and its parallel resistor 28. For the purpose of supplying a negative voltage to the grid 20c of valve 20, a transformer 30 is provided, the primary winding of which is connected to a source of alternating voltage which may be and preferably is the same as the source 17, 18 and the secondary winding of which is connected to capacitance 25. A rectifying device 31 is included in the connections between one terminal of the secondary winding of transformer 30 and one terminal of the capacitance 25. The rectifying device 31 has a cathode 31a that is connected to the common point between the two capacitances 25, 26 and is also provided with two anodes 31b and 31c. As shown, the anode 31b is connected to one terminal of the secondary winding of transformer 30 in such a manner that a negative voltage is applied to the grid 20c of valve 20. The time constant of the capacitance 25 is such that the charge holds over to the beginning of the next positive half-cycle of anode voltage and prevents the valve from becoming conducting.

As thus far described, the voltage applied to the control electrode is less positive than the critical valve during each positive half-cycle of applied anode voltage and thus would never conduct current. However, since it is desired that the valve 20 shall supply current impulses to the coil 15 that are out of phase with the current impulses supplied to the coil 11, means are provided for overcoming the negative voltage supplied to the grid circuit of valve 20 during positive half-cycles of anode voltage when the valve 19 is not conducting. These means are illustrated as comprising a transformer 32, the primary winding of which is connected across the terminals of the coil 11, and the terminals of the secondary winding of which are connected across the capacitance 26 with the rectifying device 31 included in the connections. As indicated, one terminal of the secondary winding of the transformer 32 is connected to anode 31c of rectifying device 31. The connections are so arranged that a positive voltage is applied to the grid 20c of the valve 20 each time an impulse of current is passed through the coil 11. This positive voltage is of sufficient magnitude to overcome the negative voltage bias of the capacitance 25 and thus to supply a positive voltage to the grid 20c. The time constant of capacitance 26 is such that the grid 20c is maintained positive until the next time the voltage of the anode 20a becomes positive, and when this occurs, the valve 20 is rendered conducting.

With the foregoing understanding of the elements and apparatus and their organization in the completed system, the operation of the system itself will readily be understood from the following detailed description.

In Fig. 2, the alternating voltage of the sources 17 and 18 is represented by the sinusoidal curve 33 in which ordinates above the axis O—O represent positive values of voltage and ordinates below the axis O—O represent negative values of voltage. The frequency of this voltage may be assumed to be 60 cycles per second, and it may also be assumed that it is desired to supply 30 unidirectional current impulses per second to the coil 11 and 30 unidirectional current impulses to the coil 15 one hundred eighty degrees out of phase with respect to the impulses supplied to the coil 11. The variable resistance 23 is varied until the time constant of the capacitance 22 and the parallel resistance 23 is such that the valve 19 conducts current only during every other positive half cycle of applied anode voltage, as represented by the heavy curves 34 and 35 in Fig. 2. When the anode voltage 33 passes through zero, the current 34 through the coil 11 would ordinarily tend to stop flowing but owing to the inductance of the coil 11, the current continues to flow until a time $t_1$ during the negative half-cycle of applied anode voltage. At this point the current flow through the coil ceases.

While the current through the coil 11 builds up, the capacitance 22 becomes charged with the polarity indicated in the drawing so that a negative voltage is applied to the grid 19c. When the capacitance 22 attains its maximum voltage, the charge begins to leak off at a rate depending upon the ohmic value of the resistance 23. During the second positive half-cycle of the anode voltage 33, the actual grid voltage at no time exceeds the critical grid voltage and consequently, the valve 19 remains non-conducting during the entire second positive half-cycle of anode voltage. However, during the third positive half-cycle of anode voltage, the grid voltage becomes more positive than the critical grid voltage and consequently, the valve 19 again becomes conducting and passes the second impulse of current 35 to the magnet coil 11 and thereafter the previously described operation is repeated.

When valve 19 is passing the current impulse 34, a voltage is induced in the secondary winding of transformer 32, and this voltage charges the capacitance 26 thorugh one anode of the rectifier 31. Transformer 32 is connected so that the kick-back voltage, i. e. the voltage induced in the secondary winding when the current 34 in the primary winding is decreasing, charges the capacitance 26. Capacitance 26 is therefore being charged during the negative half-cycle of applied anode voltage, while the valve 19 is conducting. The charge on the capacitance 26 holds over and makes the grid of valve 20 sufficiently positive so that valve 20 becomes conducting during the second positive half-cycle of anode voltage and sends an impulse of current through the coil 15, as represented by the heavy curve 36. Since the capacitance 26 has a relatively short time constant, the positive charge leaks off through the resistance 29 before the third positive half-cycle of anode voltage, and thus the capacitance 25 which applies a negative voltage to the grid 20c regains control and prevents valve 20 from conducting during the third positive half-cycle of anode voltage when the valve 19 is passing the current impulse 35. However, during the third negative half-cycle of applied voltage when the current 35 in the coil 11 is decreasing, the capacitance 26 is again being charged so that the valve 20 is rendered conducting during the fourth positive half-cycle of anode voltage.

Thus it will be noted that each of the valves 19, 20 supplies current impulses to its translating circuit that are of lower frequency than the frequency of the source from which the valves are supplied, and it will also be noted that the current impulses supplied to one circuit are substantially one hundred eighty degrees out of phase with those supplied to the other circuit.

Although in accordance with the provisions of the patent statutes, this invention is described as embodied in concrete form, it will be understood that the apparatus and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A control system comprising a source of alternating voltage, a pair of electric valves each having an anode, cathode and control electrode, connections from said source to said anodes and cathodes, both said anodes being connected to the same side of said source, a first translating circuit supplied from one of said valves, means for controlling said valve so that it conducts during one positive half-cyle of anode voltage and is non-conducting during one or more succeeding positive half-cycles, a second translating circuit supplied from the second of said valves, means for rendering said second valve non-conducting when said first valve is conducting comprising a capacitance connected between the cathode and control electrode of said second valve and having connections to said source so that a negative voltage is supplied to said control electrode, means responsive to the current impulses in said first circuit for supplying a positive voltage to the control electrode of said second valve comprising a second capacitance connected between the cathode and control electrode of said second valve and having connections to said first translating circuit, so that said second valve is rendered conducting during one of said succeeding positive half-cycles of anode voltage whereby the current pulses supplied to said circuits are out of phase with respect to each other.

2. A control system comprising in combination a first translating circuit, means for supplying unidirectional current impulses to said circuit comprising a source of alternating voltage and an electric valve supplied therefrom, a second translating circuit, an electric valve connected to said source and circuit, said valve having a cathode, anode and control electrode, a capacitance connected between the cathode and control electrode having connections to said source such that a negative voltage is supplied to said control electrode when the anode voltage is positive thereby to render said second valve non-conducting, and means responsive to the current impulses in said first translating circuit for rendering said second valve conducting comprising a second capacitance in circuit between said cathode and control electrode and having connections to said first translating circuit such that a positive voltage is suppled to said control electrode, said second capacitance having a time constant that is short in comparison with the time constant of said first capacitance.

3. A control system comprising in combination a source of alternating voltage, a first translating circuit, means for supplying unidirectional current impulses to said circuit comprising an electric valve having a cathode, anode and control electrode and supplied from said source, and means for controlling said valve so that it conducts during a positive half-cycle of anode voltage and is non-conducting during one or more succeeding positive half-cycles, a second translating circuit, means for supplying unidirectional current impulses to said second circuit comprising a second electric valve supplied from said source and having a cathode, an anode and a control electrode, a pair of capacitances connected in series between said cathode and control electrode, a rectifying device having a cathode and two anodes, connections from one of said capacitances to said source including the cathode and one anode of said rectifying device for applying a negative voltage to the control electrode of said second valve to render said second valve non-conducting during a positive half-cycle of anode voltage when said first valve is conducting, and connections from said second capacitance through the cathode and other anode of said rectifying device to said first translating circuit for applying a positive voltage to the control electrode of said second valve in response to current impulses in said first translating circuit to render said second valve conducting during one of said succeeding positive half-cycles of anode voltage when said first valve is non-conducting.

WILLIAM R. KING.